(12) United States Patent
Ueta et al.

(10) Patent No.: US 7,025,358 B2
(45) Date of Patent: Apr. 11, 2006

(54) METALLIC GASKET

(75) Inventors: Kosaku Ueta, Okabe-machi (JP);
Hideo Watanabe, Ina-machi (JP)

(73) Assignee: Japan Metal Gasket Co., Ltd. (JP)

( * ) Notice: Subject to any disclaimer, the term of this patent is extended or adjusted under 35 U.S.C. 154(b) by 147 days.

(21) Appl. No.: 10/433,558

(22) PCT Filed: Nov. 12, 2002

(86) PCT No.: PCT/JP02/11793

§ 371 (c)(1),
(2), (4) Date: May 30, 2003

(87) PCT Pub. No.: WO03/085292

PCT Pub. Date: Oct. 16, 2003

(65) Prior Publication Data

US 2004/0130102 A1 Jul. 8, 2004

(30) Foreign Application Priority Data

| Apr. 4, 2002 | (JP) | 2002-102437 |
|---|---|---|
| Jun. 5, 2002 | (JP) | 2002-164260 |
| Jul. 17, 2002 | (JP) | 2002-208718 |
| Jul. 18, 2002 | (JP) | 2002-209387 |
| Jul. 31, 2002 | (JP) | 2002-223901 |
| Aug. 28, 2002 | (JP) | 2002-248920 |
| Oct. 18, 2002 | (JP) | 2002-304210 |

(51) Int. Cl.
*F02F 11/00* (2006.01)

(52) U.S. Cl. .................. 277/592; 277/594; 277/596

(58) Field of Classification Search .......... 277/592–598
See application file for complete search history.

(56) References Cited

U.S. PATENT DOCUMENTS 3,930,656 A * 1/1976 Jelinek .................. 277/611
4,721,315 A 1/1988 Ueta ..................... 277/235
5,348,311 A * 9/1994 Miyaoh et al. .......... 277/598

(Continued)

FOREIGN PATENT DOCUMENTS

| EP | 0 853 204 A1 | 7/1998 |
|---|---|---|
| JP | 60003465 | 1/1985 |
| JP | 63036877 | 2/1988 |
| JP | 118147 | 8/1989 |
| JP | 2296578 | 12/1990 |
| JP | 2000230640 | 8/2000 |
| JP | 2001032938 | 2/2001 |
| JP | 2001032941 | 2/2001 |
| JP | 2001173791 | 6/2001 |
| JP | 2001295947 | 10/2001 |
| JP | 2002235078 | 8/2002 |
| JP | 2002361425 | 12/2002 |
| JP | 2003046226 | 2/2003 |

OTHER PUBLICATIONS

Japanese Search Report dated Feb. 12, 2003.
Copy of European Search Report dated Dec. 9, 2003.

*Primary Examiner*—Vishal Patel
(74) *Attorney, Agent, or Firm*—Young & Basile, P.C.

(57) ABSTRACT

A metallic gasket comprising a base plate having a first thickness-increased portion 3 formed at a peripheral edge on a combustion chamber opening 3 side of a base plate, and a first seal line SL1 and a second seal line SL2 arranged on the outer side of said first thickness-increased portion 3. No openings other than a cooling water hole 8 exist between said two seal lines. Beads formed along said seal lines SL1 and SL2 each consist of a convex metal bead raised only upward from an upper surface of said base plate and a rubber bead made of an elastic sealing material fixed to a convex portion and a concave portion of said metal bead. This structure of said metallic gasket can improve a processing accuracy of said metal bead and also enhance cooling effects on said metallic gasket itself and said joint surfaces of an engine, between which said metallic gasket is disposed.

11 Claims, 10 Drawing Sheets

U.S. PATENT DOCUMENTS

| | | | |
|---|---|---|---|
| 5,385,354 A | * | 1/1995 | Hagiwara et al. ............ 277/594 |
| 5,435,575 A | * | 7/1995 | Udagawa .................... 277/592 |
| 5,582,415 A | | 12/1996 | Yoshida et al. ............. 277/235 |
| 5,873,577 A | * | 2/1999 | Inamura ..................... 277/594 |
| 5,951,021 A | * | 9/1999 | Ueta .......................... 277/593 |
| 6,145,847 A | * | 11/2000 | Maeda et al. ............... 277/593 |
| 6,209,883 B1 | * | 4/2001 | Kashmerick et al. ........ 277/593 |
| 6,450,504 B1 | * | 9/2002 | Bleidt et al. ................. 277/592 |
| 6,502,830 B1 | * | 1/2003 | Teranishi et al. ............ 277/594 |
| 6,517,085 B1 | * | 2/2003 | Udagawa et al. ............ 277/592 |
| 6,682,080 B1 | * | 1/2004 | Miyaoh ....................... 277/592 |
| 2002/0000696 A1 | | 1/2002 | Okazaki et al. ............. 277/592 |

\* cited by examiner

METALLIC GASKET

This application is a national stage entry of international application no. PCT/JP02/11793, filed on Nov. 12, 2002, the entire specification, claims and drawings of which are incorporated herewith by reference.

TECHNICAL FIELD

The present invention relates to a metallic gasket and more particularly to a metallic gasket which is sandwiched in a joint between the joint surfaces of a cylinder block and a cylinder head of a water-cooled internal combustion engine, and which is capable of improving the cooling effect of the joint and the gasket itself.

BACKGROUND ART

Among conventional metallic gaskets aimed at improving the cooling effects of the parts between which a metallic gasket is sandwiched, there is one which is described in Japanese Patent Laid-Open No. 60-3465.

As shown in FIGS. 21 and 22, this metallic gasket comprises a base plate 50 made of a thin, high-rigidity, elastic metal plate having a first metal bead 52 formed along a seal line SL1 encircling the inner peripheral edge of each combustion chamber opening 51. In the base plate 50, on the outer side of the first metal bead 52, a second metal bead 55 is formed along a seal line SL2 encircling cooling water holes 53 but separating and not encircling bolt holes 54. Reference numeral 56 denotes an oil hole, and a third seal line SL3 is formed encircling the inner peripheral edge of the oil hole 56.

When the metallic gasket is mounted at the joint between the joint surface of a cylinder block 60 and the joint surface of a cylinder head 61 and fastened with bolts, the metal beads 52, 55 are elastically deformed according to a fastening force, a combustion gas of the combustion chamber bore 51 is line-sealed by the first metal bead 52 and a gap space S at a minute height, to which only the cooling water holes 53 are open, is formed between the two metal beads 52, 55. Cooling water is pressure-fed through the cooling water holes 53 into the gap space S when the engine is running, and as a result of cooling water circulation, the joint surfaces and the metallic gasket itself are cooled. Also by the pumping action of vibration amplitude caused by explosion of the combustion gas, the flow of cooling water to the gap space S is promoted.

The minute gap of the gap space S is formed by a balance of the axial tension of the clamping bolts of the engine with the urging force of the metal beads 52, 55 that resist the fastening. Since a line seal by metal is applied, it is necessary to set a high gasket factor to secure a desired sealing property, so that the axial tension of the bolts must be set on a higher side, and the gap tends to become small.

Further, the cubical expansion of the engine occurs by the heat of engine operation, increasing the fastening pressure, and as the temperature rises, the above-mentioned gap decreases. Progresses have been made in reductions in size and weight, technical sophistication, and energy saving of the engine, and aluminum has come to be used in greater quantities as material for the engines. As a result of increased expansion coefficient by a difference of materials, there is a tendency that it is becoming difficult to secure the above-mentioned gap.

Further, in the bead structure of the above-mentioned gasket, as described above, the metal beads 52, 55 formed in the base plate 50 need to generate a high surface pressure. Therefore, it is necessary to adopt a material of high hardness, and in hard materials, internal stress concentrates in the portions of bending radius of the metal beads 52, 55, and when subjected to repetitive stress by vibration amplitude, they are liable to fatigue failure, and gasket lifetime is shortened.

Supposing an engine is made by aluminum, casting of aluminum is difficult and blowholes occur in casting. Therefore, when processing the joint surfaces, adjacent blowholes on the joint surfaces are sometimes connected. At this time, the conventional beads 52, 55 are for line sealing and come into metal-to-metal contact with the joint surfaces, and therefore the blowholes may stretch, running across the line-sealed bead line, or the seal line may be displaced during operation due to an expansion difference between materials of the gasket and the engine, resulting in the beads 52, 55 being located on the blowholes, increasing chances of water leakage. An aluminum-made engine is liable to dents in transit. Those dents may give rise to the above-mentioned phenomena.

Further, since the base plate 50 needs to be formed by a material of high hardness, it is difficult to improve the processing accuracy of the metal beads 52, 55 formed by bending the base plate 50.

Among other conventional metallic gaskets, there is one which is disclosed in Japanese Patent Laid-Open No. 2001-173791.

As shown in FIG. 23, this metallic gasket comprises two base plates 50. In other words, a thickness-increased portion 52 is formed at the inner peripheral end of the combustion chamber opening 51 side of the thicker base plate (the upper base plate) out of the two base plates 50, convex beads 53 are formed on the base plates 50, each on the outer side of the thickness-increased portion 52 and at a height higher than the thickness of the thickness-increased portion 52, and the two base plates 50 are laminated in such a way that the convex sides of the base-plate beads 53 face each other. Further, an elastic sealing material 54 is filled in the outside-facing concave portions of the metal bead 53.

The metallic gasket is disposed between the opposing joint surfaces of the cylinder head and the cylinder block, and when they are fastened together, the base-plate beads 53 are compressed and deformed until the thickness-increased portion abuts on the opposite base plate at the peripheral edge of the combustion chamber opening, concurrently with which, the elastic sealing material parts 54 filled in the concave portion are compressed and deformed, and consequently a combustion gas, oil, and cooling water are sealed by a sealing pressure from a combined spring including the spring force of the base-plate beads 53 and the spring force of the elastic sealing material parts 54. Needless to say, some of the conventional metal beads have no elastic sealing material filled in their concave portion and some conventional metal beads are formed by a single piece of base plate.

In this conventional metallic gasket, when the base-plate beads 53 and the elastic sealing material parts 54 are deformed when the bolts are tightened, they cooperate to generate a resilience to thereby generate a required sealing pressure along the seal lines.

However, when the base plate 50 is formed of metal plate of low hardness with a view to preventing fatigue failure of the base-plate beads 53 and reducing production cost, in the above-mentioned metallic gasket, when the bolts are fastened and the elastic sealing material 54 in the concave portion is deformed under compression, an external force acts to deform the base plate 50 and the base-plate beads 53 to warp in the through-thickness direction. When the base plate 50 is made of metal of low hardness as mentioned above, the bead shape-preserving power is low and the base plate deformation resistance is weak, so that the sealing property is reduced accordingly.

By repeated load by repetition of operation and stoppage of the engine, after a long period of use, problems arise, such as a decrease in axial tension of the clamping bolts, changes with time of the base-plate bead 53 on the base plate 50, or deterioration in the elastic sealing material 54 of the concave portion of the bead; therefore, the seal surface pressure is likely to drop. Such problems tend to come up particularly at overhanging parts on the outer side of the clamping bolts.

When the elastic sealing material 54 is formed by baking in the concave portions of the base plates, even if the elastic sealing material 54 at high temperature is filled in the concave portions, it changes in volume by an amount of thermal expansion during subsequent open cooling, the center portion of the elastic sealing material 54 where the thickness is at its highest contracts by an amount of thermal shrinkage. This is disadvantageous when the surface pressure decreases as described above. Such a phenomenon as this seems to be likely to occur particularly when the gasket is mounted in the engine which has been assembled with a weak fastening axial tension.

DISCLOSURE OF THE INVENTION

The present invention has been made with the above problems in mind, and has as its task to provide a metallic gasket capable of improving the processing accuracy of metal beads, and enhancing the cooling effects on the metallic gasket itself and the joint surfaces in which the metallic gasket is mounted.

To solve the above problems, the invention set forth in claim 1 relates to a metallic gasket comprising a base plate made of a thin metal plate, the base plate having at least a combustion chamber opening and a cooling water hole, and having a first thickness-increased portion made of metal and increased in thickness and encircling a peripheral portion of the combustion chamber opening, a first bead formed on the outer side of the first thickness-increased portion of the base plate in a manner to endlessly encircle the combustion chamber opening, and a second bead formed on the outer side of the first bead in a manner to endlessly encircle the combustion chamber opening and the cooling water hole, wherein in a region of the base plate between the first bead and the second bead, there are no holes other than the cooling water hole, and each of the first and second beads is a composite bead of a metal bead and a rubber bead, wherein the metal bead is formed only on one surface of the base plate by bending the base plate in a through-thickness direction to create a convex portion higher than the height of the first thickness-increased portion, wherein the rubber bead is formed of an elastic sealing material fixed to the convex portion side surface of the metal bead and filled in a concave portion on the reverse side of the convex portion and the rubber bead is compressed and deformed in the through-thickness direction in cooperation with the deformation of the metal bead, and wherein the elastic sealing material on the surface of the convex portion side is fixed at least to the surface of the convex portion of the metal bead and is arranged to have a height equal or substantially equal to the height of the metal bead.

Incidentally, it is desirable to limit the largest width of the rubber bead on the convex portion side within 1.5 times the width of the metal bead with the exception of the bolted portions which are subjected to a large pressure. It is necessary to apply more load to the base plate where the rubber bead has a larger width. From a viewpoint of inhibiting an increase in load, it is desirable to limit the width of the bead of an elastic sealing material within 1.5 times the width of the metal bead as mentioned above. This does not apply to where large load is to be applied locally.

According to the present invention, the first thickness-increased portion made of metal receives most of the fastening surface pressure and seals a combustion gas of high pressure. Cooling water that flows through the cooling water hole into and out of a gap space between the first bead and the second bead is sealed by a composite spring force of a spring force of the metal bead higher than the height of the thickness-increased portion and a spring force by the elastic deformation of the rubber bead formed on both surfaces of the metal bead.

At this time, since the compression-deformed amount of the beads is regulated by the first thickness-increased portion, a gap space by a gap greater than before is formed between the first bead and the second bead, and consequently the cooling effect on the metal bead and so on is increased.

At this time, the bead according to the present invention applies a seal by a composite spring force of the metal bead and the rubber bead, and since the seal surface of the beads that contact the opposing joint surface is formed by an elastic sealing material, the gasket factor is small, so that the joint can be sealed with a low surface pressure and no problem arises even if the compression-deformed amount is regulated as mentioned above.

Because the sealing surface is formed by the elastic sealing material, even if there are blowholes on the joint surfaces, a satisfactory sealing can be achieved to prevent water leakage.

The rubber bead is soft and adapts itself to the joint surfaces and is capable of accommodating the processed surface roughness and satisfactorily sealing the flaws that occur in transit.

Because a small gasket factor can be adopted for the bead as mentioned above, the hardness of the base plate used for metal beads can be set at a low value. For example, with an intention of providing inexpensive gaskets, plated soft steel may be adopted instead of high-hardness stainless steel. The amount of elastic sealing material used is small because it is used only on the upper and lower surfaces of the bead lines for sealing.

The metal beads are required only slightly higher than the height of the first thickness-increased portion, and the height of the rubber beads is set so as to be equal or slightly higher than the height of the metal beads in designing the mold, and therefore the processing accuracy is stable. If the height of the metal beads is 30% higher than the first thickness-increased portion, the elastic sealing material does not suffer deformation fracture, generated load is a composite force of the metal beads of soft steel and the soft rubber beads and is therefore not strong, and there is not such a large loss of load as to affects the sealing against the combustion gas pressure.

The invention is also characterized in that a second thickness-increased portion is provided at an outer peripheral edge of the base plate.

According to the present invention, most of the fastening surface pressure is received by the two thickness-increased portions made of metal. In the additional presence of the thickness-increased portion at the outer peripheral edge of the base plate, the compression-deformed amount of the beads can be set stably at a specified value.

The invention is also characterized in that to equalize the surface pressure when the gasket is mounted between the joint surfaces, the height of the first thickness-increased portion is varied partly and that the height of the second thickness-increased portion is lower than the lowest height of the first thickness-increased portion.

According to the present invention, as a result of the sealing pressure being equalized by the first thickness-increased portion, the bolt fastening force can be utilized efficiently. Equalizing the sealing pressure in the circumferential direction at the inner peripheral portion of the combustion chamber opening means that the pressure to that portion of the joint surface which is the first thickness-increased portion at the inner peripheral portion of the combustion chamber opening is also equalized circumferentially, thereby preventing the shape distortion of the bore on the joint surface by the sealing pressure at the first thickness-increased portion. If the shape of the opening on the joint surface is deformed, or distorted, this leads to power loss or oil consumption increase.

In the first and second thickness-increased portions that receive a greater part of the bolt fastening force, by setting the second thickness-increased portion to a relatively lower thickness, it becomes possible for the largest load to be applied to the first thickness-increased portion, thereby generating a high sealing pressure.

The invention is also characterized in that the first thickness-increased portion is formed by folding back the peripheral edge on the combustion chamber opening side of the base plate, and a shim is fitted into the folded portion to thereby adjust the height of the first thickness-increased portion.

According to the present invention, it becomes possible to lower the hardness of the base plate as described above, and therefore forming the first thickness-increased portion by bending becomes easier and it becomes possible to adjust the height of the first thickness-increased portion by means of a shim.

When the second thickness-increased portion is formed by bending, by the above mentioned insertion of a shim, it becomes possible to set the second thickness-increased portion to a lower height than the height of the first thickness-increased portion without subjecting the second thickness-increased portion to forging.

The invention is also characterized in that the first thickness-increased portion is formed by folding back the peripheral end on the combustion chamber opening side of the base plate, and a leaf spring for spring action in the through-thickness direction is inserted in the folded portion.

According to the present invention, by imparting elasticity by the leaf spring to the whole or a part of the first thickness-increased portion, the surface pressure in the circumferential direction can be equalized easily, and by providing the first thickness-increased portion with the spring, the first thickness-increased portion can follow after the thermal deformation that occurs during engine operation, and consequently the surface pressure equalization takes places in the first thickness-increased portion in a manner to follow after the thermal deformation.

The invention is also characterized in that by partly varying at least one of the height of protrusion and the width of the beads in the extending direction thereof, the sealing surface pressure by the beads is equalized in the extending direction thereof.

The invention is characterized in that a thin corrosion-resistant film is also fixed to that portion of the base plate located between the first bead and the second bead and at least on the surface of the convex portion side of the metal beads on the base plate.

The invention is also characterized in that one or not less than two seal lines are arranged on at least one of the surface of the elastic sealing material fixed to the surface of the convex portion side and the surface of the elastic sealing material filled in the concave portion, the sealing material being used to form the rubber beads.

The invention is also characterized in that one line or not less than two lines of protrusions are provided where the sealing pressure is relatively low on at least one of the surface of the elastic sealing material fixed to the surface of the convex portion side and the surface of the sealing material filled in the concave portion of the base plate, the sealing material being used to constitute the rubber beads.

The invention is also characterized in that in the above-mentioned lines of protrusions, at least one of the height of protrusion and the width in the extending direction thereof is varied according to the sealing pressure at formed positions the protrusions, and at least one of the protrusion height and the width is set at a larger value where the sealing pressure is lower.

The invention is also characterized in that a plurality of protrusions are provided on at least one of the surface of elastic sealing material fixed to the surface of the convex portion side and the surface of the elastic sealing material filled in the concave portion of the beads, and in the plurality of protrusions, at least one of an area per height of protrusion and a unit length is varied according to the sealing pressure at formed positions of protrusions.

The invention as set forth wherein a plurality of base plates are stacked in a multilayered structure.

BEST MODE FOR CARRYING OUT THE INVENTION

A first embodiment of the present invention will be described with reference to the drawings.

Figure 1:
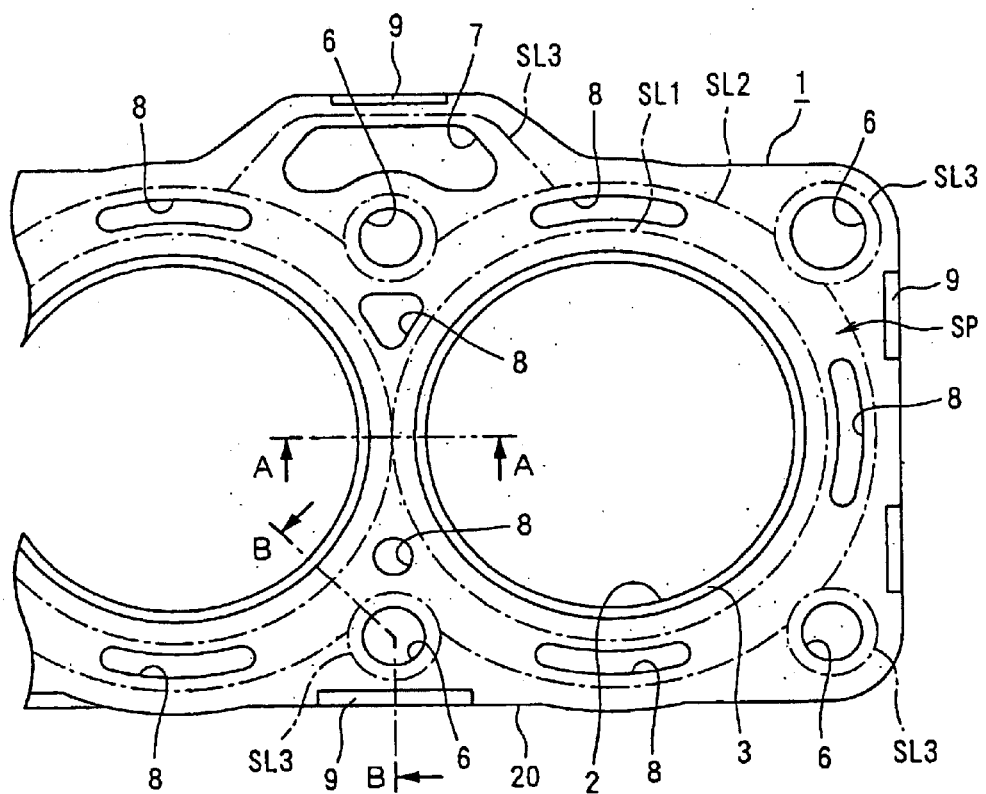
FIG. 1 is plan view for explaining a metallic gasket according to a first embodiment of the present invention.
Figure 2:
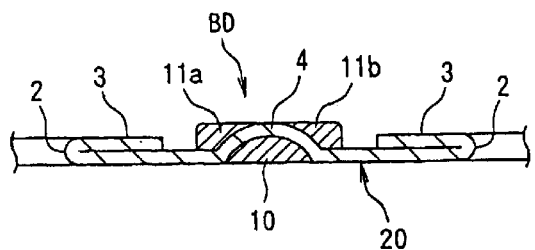
FIG. 2 is a sectional view taken along the line A—A in FIG. 1.
Figure 3:
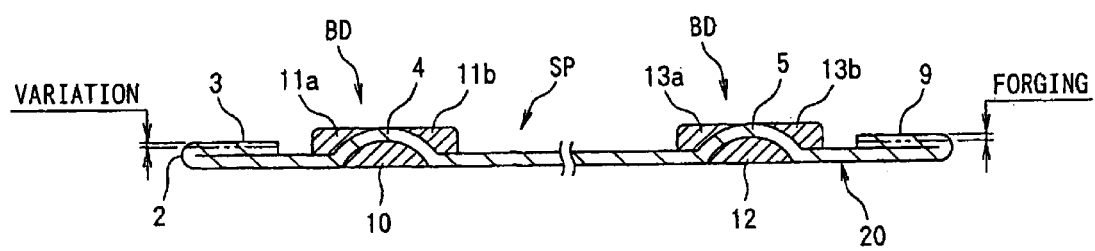
FIG. 3 is a sectional view taken along the line B—B in FIG. 1.

FIG. 1 is a plan view for explaining a metallic gasket according to the first embodiment of the present invention. FIG. 2 is a sectional view taken along the line A—A in FIG. 1. FIG. 3 is a sectional view taken along the line B—B in FIG. 3.

Description will next be made of the structure of the metallic gasket according to the first embodiment.

A metallic gasket 1 according to the first embodiment is an embodiment of a cylinder head gasket for an internal combustion engine. A base plate 20 of the metallic gasket 1 comprises thin metal plate, such stainless steel plate, soft steel plate, or steel plate. Here, the first embodiment will be described on the assumption that soft steel plate is used as a material for the base plate 20 with a view to providing a less expensive product.

As shown in FIG. 1, the base plate 20 is provided with a plurality of combustion chamber openings 2 aligned to each other in the longitudinal direction, and a first thickness-increased portion 3 is formed by upwardly folding back the whole of the inner peripheral edge on the each combustion chamber opening 2 side of the base plate. The height of the first thickness-increased portion 3 is varied in its extending direction, such as by lowering the height at positions near bolt holes, to thereby equalize the surface pressure in the existing direction of the thickness-increased direction.

On the outer side of the first thickness-increased portion 3, there is provided a first seal line SL1 in a manner to endlessly encircle the combustion chamber opening 2 along the peripheral portion of the combustion chamber opening 2. On the outer side of the first seal line SL1, a plurality of cooling water holes 8 are arranged along the peripheral portion of each combustion chamber 2.

On the outer side of the plurality of the cooling water holes 8, a second seal line SL2 is provided in a manner to encircle all of the cooling water holes 8. The second seal line SL2 is so arranged that there are no other holes than the cooling water holes 8 in the area of the base plate 20 which is located between the first seal line SL1 and the second seal line SL2.

On the outer side of the seal line SL2, the bolt holes 6 are located. An oil hole is denoted by reference numeral 7.

A third seal line SL3 is provided in a manner to encircle the bolt holes 6 and the oil hole 7.

The seal lines SL1 to SL3 are integrated into a single common seal line where they run adjacent to one another.

A second thickness-increased portion 9 is formed by upwardly folding up the outer peripheral edge of the base plate 20 at some parts of the base plate 20. The height of the second thickness-increased portion 9 is arranged to be a little lower than the smallest height of the first thickness-increased portion 3 by forging.

As shown in FIGS. 2 and 3, a bead BD is formed along the seal lines SL1 to SL3. As shown in FIGS. 2 and 3, the bead BD in this embodiment is formed as a composite of a metal bead 4 or 5 and a rubber bead.

The metal beads 4, 5 in this embodiment are full beads formed by bending the base plate 20 so as to protrude on only one surface side (top surface side) of the base plate 20 and the beads are arranged to be higher than the first thickness-increased portion 3. Therefore, when the beads are elastically deformed in the through-thickness direction, a sealing pressure can be generated.

The above-mentioned rubber bead comprises elastic sealing material parts 11a, 11b, 13a, 13b fixed to the surface of the base plate 20 on the convex portion side of the metal beads 4, 5, and elastic sealing material parts 10 and 12 filled in the concave portion on the reverse side of the convex portion. The elastic sealing material parts 11a, 11b, 13a, 13b, and 10, 12 may be formed by a corrosion-resistant, elastic material, e.g., a rubber material, such as fluororubber, NBR, silicon rubber, or a resin material.

The elastic sealing material parts 11a, 11b, 13a, 13b fixed to the convex portion side of the metal beads 4, 5 are fixed to the surface of the base plate 20 in a manner to cover at least both sides across the width of the metal beads 4, 5. The height of the elastic sealing material parts 11a, 11b, 13a, 13b fixed to the convex portion side of the metal beads 4, 5 is made equal or substantially equal to the height of the convex portion of the metal beads, and the top surface is made substantially parallel with the flat surface of the base plate 20. The height of the elastic sealing material parts 11a, 11b, 13a, 13b may be a little higher than the height of the convex portion of the metal beads 4, 5. Note, however, that the above-mentioned height of the elastic sealing material parts must be a height such that the compression-deformed amount regulated by the height of the first thickness-increased portion 3 is not more than 35% (the known compression-deformed amount of a specific material, which does not give rise to buckling).

On the other hand, the amount of the elastic sealing material parts 10 and 12 filled in the concave portions of the metal beads 4, 5 is made substantially equal to the capacities of the concave portions and their back surface is made substantially flush with the flat back surface of the base plate 20.

Description will next be made of the operation and the effect, etc. of the metallic gasket mentioned above.

When a metallic gasket 1 structured as described is disposed between the opposing joint surfaces of a cylinder block and a cylinder head and fastened with clamping bolts, the elastic sealing material parts 11a, 11b, 13a, 13b and the elastic sealing material parts 10, 12 that constitute the rubber beads are compressed and deformed in the through-thickness direction in cooperation with the metal beads 4, 5, and at the end of fastening, the largest surface pressure concentrates on and the largest load acts on the first thickness-increased portion 3 due to a difference in thickness between the first thickness-increased portion 3 with the largest thickness of the base plate 2 and the remaining portions.

Therefore, a combustion gas at the highest pressure can be sealed by the first thickness-increased portion 3 pressed against the joint surface. On the outer side of the first thickness-increased portion 3, an area seal is applied by an elastic resilience of the beads BD (metal beads 4, 5 and rubber beads) formed along the first and second seal lines SL1 and SL2 as a shield against cooling water seeping out between the seal lines.

And, as the largest compression-deformed amount of the beads BD is regulated by the first thickness-increased portion 3, a largest ever space, more specifically, a gap space SP corresponding to the clearance of a piece of the whole base plate 20 is formed between the first seal line SL1 and the second seal line SL2, thereby increasing the cooling effects of the metallic gasket 1. In other words, as a water pump pressure-feeds the cooling water into the gap space SP from a cooling water hole 8, and the cooling water, while flowing, absorbs the heat generated by engine operation and transmitted from the engine, and simultaneously cools the gasket 1, thus preventing the rubber beads of the gasket from deteriorating by heat.

At this time, the beads BD in this embodiment seal the joint surfaces by a composite spring force of the metal beads 4, 5 and the rubber beads, and since the sealing areas of the beads to contact the upper and lower joint surfaces are formed by the elastic sealing material parts 11a, 11b, 13a, 13b and 10, 12, a small gasket factor can be set and the sealing can be applied by a low surface pressure, and even if the compression-deformed amount is regulated to increase the amount of the gap space SP as described above, no problem arises.

Because the upper and lower sealing areas are the sealing areas by the elastic sealing material parts 11a, 11b, 13a 13b and 120, 12, if there are blowholes or the like on the joint surfaces, a sufficient sealing against water leakage can be obtained. Further, the rubber beads are capable of sufficiently sealing the surface processing roughness or the flaws that occur in transit.

As mentioned above, since a small gasket factor can be set for the beads BD, no problem occurs if the base plate 20 is formed by low-hardness less-expensive soft steel plate. The elastic sealing material parts 11a, 11b, 13a, 13b and 10, 12 are used only on the upper and lower portions of the bead lines required for sealing, and therefore the consumed amount is small.

The metal beads 4, 5 are required only slightly higher than the height of the first thickness-increased portion 3, and the height of the rubber beads is set so as to be equal or slightly higher than the height of the metal beads 4, 5 in designing the mold, and therefore the processing accuracy is stable. If the height of the metal beads is 30% higher than the first thickness-increased portion, the elastic sealing material does not suffer deformation fracture, generated load is a composite force of the metal beads of soft steel and the soft rubber beads and is therefore not strong, and there is not such a large loss of load as to affects the sealing against the combustion gas pressure.

By varying the thickness in the circumferential direction of the first thickness-increased portion 3, the sealing pressure is equalized and consequently the fastening force of the bolts can be utilized efficiently. As a result of the pressure being equalized in the circumferential direction in the peripheral portion of the combustion chamber opening 2, the pressure of the joint surface in contact with the first thickness-increased portion 3 on the opening edge of the combustion chamber (bore) is equalized in the circumferential direction, and therefore the roundness of the combustion chamber bore is prevented from being impaired by the imbalance of the sealing pressure at the first thickness-increased portion 3. The impairment of the roundness of the combustion chamber (bore) leads to increases in power loss and oil consumption. Between the first and second thickness-increased portions 3, 9 which receive a large proportion of the bolt fastening force, by making the second thickness-increased portion 9 relatively lower in thickness, the largest load may be applied to the first thickness-increased portion 3 to thereby generate a high sealing pressure.

Since the base plate 20 is formed by soft steel plate of low hardness, it is easy to form the first thickness-increased portion 3 and the second thickness-increased portion 9 by bending.

Figure 4:
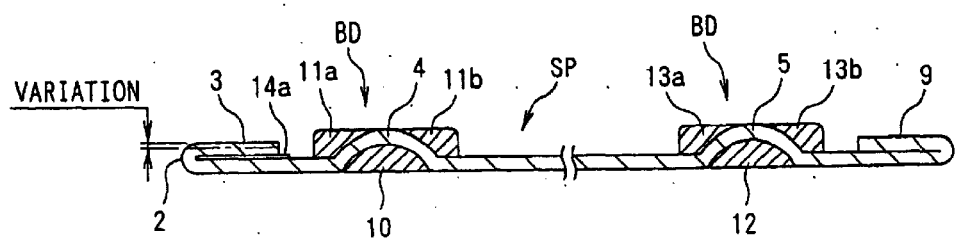
FIG. 4 is a sectional view for explaining another mode of embodying a first thickness-increased portion.

The variation of the height of the first thickness-increased portion 3 in the circumferential direction may be adjusted by forging, or as shown in FIG. 4, may be adjusted by inserting a shim plate 14a into the folded portion. When the shim plate 14a is inserted in the folded portion along the whole periphery of the first thickness-increased portion 3, where there is the smallest thickness portion of the shim plate 14a, the first thickness-increased portion 3 is at its smallest thickness. As a result, the height of the second thickness-increased portion 9 can be made lower than the first thickness-increased portion 3 without forging. In other words, setting the shim plate 14a in the first thickness-increased portion 3 obviates the need to perform the forging to the second thickness-increased portion 9. The shim plate 14a set in the first thickness-increased portion 3 increases the height of the first thickness-increased portion 3 by its thickness, and therefore the gap space SP in which cooling water circulates can be made wider in proportion to the thickness of the shim plate 14a, thus improving the cooling effects.

Figure 5:
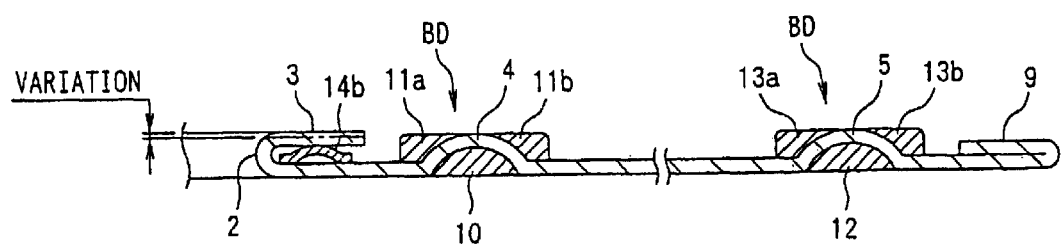
FIG. 5 is a sectional view for explaining yet another mode of embodying the first thickness-increased portion.

At this time, as shown in FIG. 5, a leaf spring 14b elastically deformable in the through-thickness direction may be inserted as the shim plate 14a into the first thickness-increased portion 3. In this case, in addition to the above-mentioned effect, the surface pressure in the circumferential direction of the first thickness-increased portion 3 is equalized more readily by the elastic force of the leaf spring 14b, and by this added spring of the first thickness-increased portion 3, the first thickness-increased portion 3 can follow after the thermal deformation that occurs during engine operation, and consequently the surface pressure equalization takes places in the first thickness-increased portion 3 in a manner to follow the thermal deformation.

Figure 6:
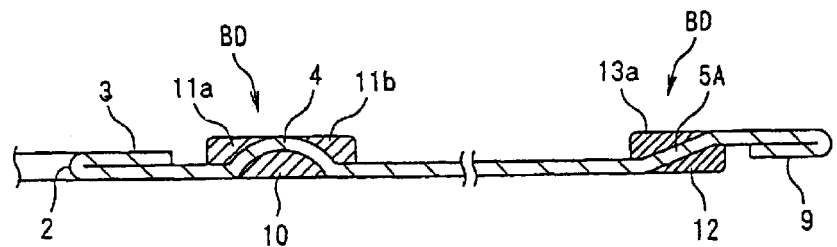
FIG. 6 is a diagram for explaining another mode of embodying a bead.

In this embodiment, description has been made of the metal beads 4, 5 as full beads, but as shown in FIG. 6, in the bead BD formed along the second seal line SL2, the metal bead 5 may be formed by a half bead. In other words, in the areas where an available seal width is too narrow to provide a full-bead 5, the metal bead 5 may be formed as a half bead to suit the narrow seal width.

Figure 7:
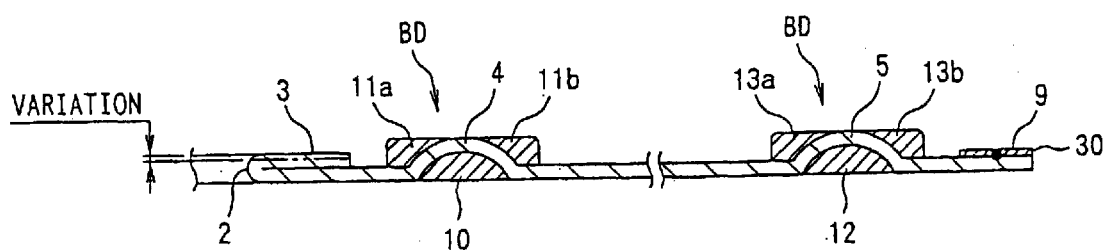
FIG. 7 is a sectional view for explaining a still other mode of embodying the first thickness-increased portion.

In this embodiment, description has been made of the thickness-increased portion formed by folding back the base plate, but this is not intended to give a definition of limits of the invention. For example, as shown in FIG. 7, the second thickness-increased portion 9 may be formed by welding a thin plate thinner than the base plate 20 to the outer peripheral edge, thus obviating the necessity of forging mentioned above. Or, the second thickness-increased portion may be formed by folding back the peripheral portion of each bolt hole.

The sealing surface pressure by the metal beads 4, 5 may be equalized by partly varying at least one of the protruding height and the width of the beads in their extending direction. For example, the protrusions of the beads are made relatively low or the bead width is made relatively narrow in the vicinity of bolts. By equalizing the sealing pressure, the gasket can be sealed with high accuracy.

To the base plate part between the two beads BD along SL1 and SL2, a corrosion-resistant thin film may be fixed, which prevents rusting on the surface of the base plate which always contact water.

A second embodiment of the present invention will be described with reference to the drawings.

The basic structure of this second embodiment is the same as that of the first embodiment, but slightly differs in the structure of the bead from the first embodiment.

Beads are formed along the seal lines SL1 and SL2.

Figure 8:
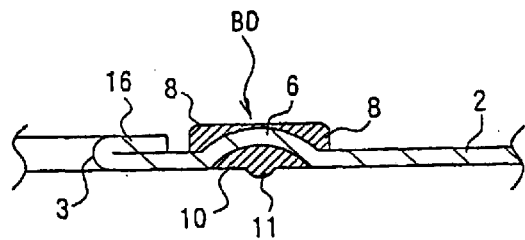
FIG. 8 is a sectional view showing a bead according to a second embodiment of the present invention.
Figure 9:
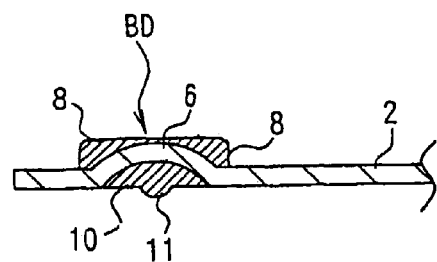
FIG. 9 is another example of protrusion formation.

As shown in FIGS. 8 and 9, the bead BD according to this embodiment is a composite bead formed by a base-plate bead 6 as a full bead and rubber beads 8, 10.

The base-plate bead 6 is formed by bending the base plate in the through-thickness direction and the base-plate bead 6 is formed convex that is higher than the height of the thickness-increased portion 16.

The rubber bead comprises a first elastic sealing material part 10 filled in the concave portion of the base-plate bead 6, and a second elastic sealing material part 8 fixed to the convex portion side of the base-plate bead.

The first elastic sealing material part 10 is arranged such that the under surface of it is flat and flush with the under surface of the base plate 2. Approximately in the center of the width direction of the bead and on the under surface of the bead, a convex protrusion 11 is formed along the seal lines SL1 and SL2.

The second elastic sealing material part 8 is formed with a width slightly wider than the width of the base-plate bead 6 and on the surface of the convex portion of the bead and on the flat surface continuous to the convex portion. The second elastic sealing material part 8 is designed so that its height is almost equal to the height of the base-plate bead 6 and the surface (the top surface) is substantially flat.

The width of the second elastic sealing material part 8 is preferably not more than 1.5 times the width of the base-plate bead 6. If the width is increased excessively, load increases excessively. The height of the elastic sealing material part 8 is preferably in the range of 0.9 to 1.1 times the height of the base-plate bead 6.

The number and the kinds of holes, such as the bolt holes 4 formed in the base plate 2, and the location of the seal lines SL1 and SL2 naturally differ with the kind of a cylinder block and a cylinder head between which the metallic gasket 1 is disposed.

The metallic gasket 1 structured as described is set in place when it is disposed between the joint surfaces of the cylinder block and the cylinder head of an engine and fastened with clamping bolts. The beads are deformed by the fastening force of the clamping bolts and a required sealing pressure is generated along the seal lines to thereby seal oil, water and so on.

When the gasket is fastened, the thickness-increased portions 16 provided at the peripheral end portion of the combustion chamber opening 3 serve to limit the compression-deformed amount of the beads, a high surface pressure occurs at the thickness-increased portions 16, so that the thickness-increased portion 16 seals a combustion gas at high temperature and high pressure.

When no coating is applied to the surface of the thickness-increased portion 16 to supply the gasket at a low price, the thickness-increased portion 16 of the gasket comes into metal-to-metal contact with the machined surfaces (joint surfaces) of the engine, and consequently there is a tool-mark irregularity of 3 to 6 microns on the machined surfaces.

The explosion pressure by engine operation is not a constantly-applied pressure but a pulsating pressure; therefore, there is some pressure leakage from the thickness-increased portion 16 to the outer periphery side. However, the pressure is sealed by the bead BD on the outer side of the thickness-increased portion 16.

The bead BD according to this embodiment is so structured as to generate a required sealing pressure by a composite spring of the base-plate bead 6 and the rubber bead produced when they are compressed and deformed, and this composite structure makes it possible to reduce the hardness of the base plate 2 that forms the base-plate bead 6. The beads contact the upper and lower joint surfaces at the flat surfaces of the compressed and deformed elastic sealing material parts 8 and 10, and the soft elastic sealing material parts 8 and 10 come into tight contact with the joint surfaces, closing any small spaces of the tool marks, thereby sealing the combustion gas that leaks from the thickness-increased portion 16 under pulsating pressure mentioned above.

In a gasket of a structure that an elastic sealing material is filled only in the concave portion of the base-plate bead 6, when the elastic sealing material 10 is compressed and deformed, an external force is generated to deform the base-plate bead 6 and the flat portion on each side continuous to the base-plate bead 6 in such a manner that they warp upward. The lower the hardness of the base plate 2 is made to inhibit fatigue failure of the base-plate bead 6 and hold down the cost of the base plate 2, the more conspicuous the deformation, such as upward warp is likely to become. However, in this embodiment, the second elastic sealing material 8 is provided also on the convex portion side and the second elastic sealing material 8 is deformed to prevent deformation of the base-plate bead 6 and the base plate 2, thereby preventing the deterioration of the seal performance by the first elastic sealing material 10 in the concave portion.

In the filling of the first elastic sealing material 10, the center portion of it is likely to cave in a little in a transition from high temperature to open cooling. In this embodiment, protrusions 11 and 9 are formed on the above center portion, even when the gasket is adopted in an engine whose fastening axial tension is weak, a stable seal performance can be secured at low lost in the region on the outer side of the combustion chamber opening 3. After the bolts are fastened, the protrusions 11 and 9 are in a crushed and flattened state.

No fastening problem arises in the vicinity of bolts 4 is free of as long as the bolts are fastened properly. However, the oil holes 5 and the chain chamber hole 17 are in an improperly fastened state because they are remote from clamping bolts. As the engine is subjected to repeated thermal cycles as many times as it is used, the fastening axial tension decreases to some extent. The gasket is deformed by heat during engine operation, thus aggravating the sealing condition.

In order to implement a complete seal under those adverse conditions, in the prior art, in the bead structure having the elastic sealing material filled in the concave portion of the base-plate bead, if the hardness of the base plate 2 is increased, the spring force is increased, but the bead may suffer fatigue failure by vibration amplitude, and it is not desirable to increase the hardness so much; on the other hand, if the hardness of the base-plate bead 6 is decreased, deformation mentioned above will occur, resulting in a decrease in the spring force. To make up for this shortcoming, in this embodiment, as described above, in addition to the first elastic sealing material 10 filled in the concave portion of the base-plate bead 6, the second elastic sealing material 8 is formed on the convex portion on the reverse side of the concave portion, and the second elastic sealing material 8, structured such that its width is wider than the width of the bead and its height is substantially the same height of the base-plate bead 6, serves to prevent deformation of the base plate 2 and the base-plate bead 6.

As the hardness of the base plate 2 is lowered, the spring force is made low, but because the first elastic sealing material 8 is formed, on the convex portion, with a height equal to the height of the base-plate bead 6 to thereby regulate the deformation by the elastic sealing material 10 filled in the concave portion, with the result that the BD bead is provided with a spring force equal to or greater than a spring force by a structure that uses the base plate 2 of a high-hardness material.

Further, when the elastic sealing material 10 is formed by molding, the concave portion side of the base-plate bead 6 is processed so as to be flush with the flat surface of the base plate 2. During molding, the sealing material 10 expands thermally by high temperature, but when it is open-cooled, the central portion of the rubber large in thickness shrinks by an amount corresponding to thermal expansion, and caves in slightly, and in the portions, away from a clamping bolt, which are not fastened properly and overhang, the surface pressure may decrease, leaving chances of pressure leak.

As countermeasures, according to the invention in this patent application, as shown in FIG. 8, a small protrusion 11 is formed in the middle of the surface of the elastic sealing material 10 in the concave portion of the base plate 6, the bead is deformed without increasing the fastening load so much, and when the surface pressure decreases, the protrusion 11 formed on the surface of the first elastic sealing material 10 bulges and deforms concurrently. Though small in terms of area, the protrusion generates a high surface pressure, and serves to apply a complete seal. In other words, located in a position away from the clamping bolt to the outer circumference side, the surface pressure tends to become relatively small, the elastic sealing material on both surfaces of the base-plate bead 6 is normally pressed to the opposed joint surfaces to seal them by the compressed and deformation of the bead by the fastening load. At this time, the protrusion 11 formed on the elastic sealing material 10 on the concave portion side is deformed in a manner to be pushed into the concave portion, adapts itself to the flat surface of the joint surface, and becomes substantially flush with the flat surface (underside) of the base plate 2.

When, from this steady state, the clearance between the opposed joint surfaces at the bead position increases by vibration, for example, the surface pressure temporarily decreases, the compression-deformed amount of the bead decreases, thus reducing the sealing pressure. At the elastic sealing material 10 on the concave portion side, according to an increase in the clearance, the protrusion 11 automatically bulges to securely retain contact with the opposite joint surface and has the contact surface decreased, and can maintain the seal condition by an increase in the surface pressure by the protrusion. As the clearance decreases, the steady state is restored.

In the foregoing, description has been made of a case where the surface pressure decreases with changes in the clearance between the opposed joint surfaces. Even when the clearance between the opposed joint surfaces remain unchanged or even when the spring force decreases with deterioration with time and the surface pressure becomes smaller, as described above, because load concentrates on the protrusion 11 as the surface pressure decreases (the protrusions 11 and 9 do not necessarily bulge in this case), the surface pressure rises at the position of the protrusion 11, making it possible to maintain a specified sealing pressure.

Figure 10:
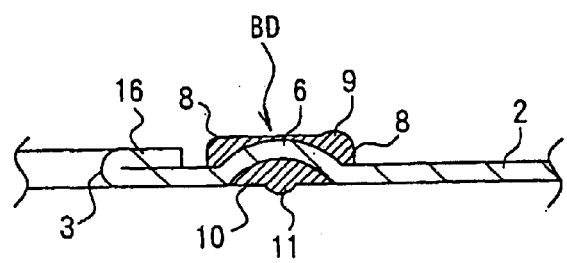
FIG. 10 is a still other example of protrusion formation.

When the change in the gap at the bead position between the joint surfaces is large, it is preferable to form a protrusion 9 also on the elastic sealing material on the convex portion of the base-plate bead 6 as shown in FIG. 10.

Figure 11:
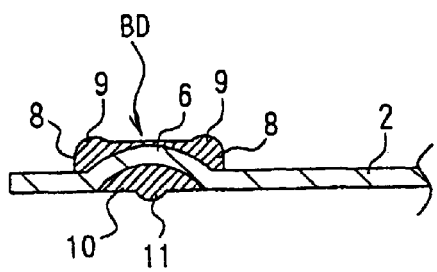
FIG. 11 is a yet further example of protrusion formation.
Figure 12:
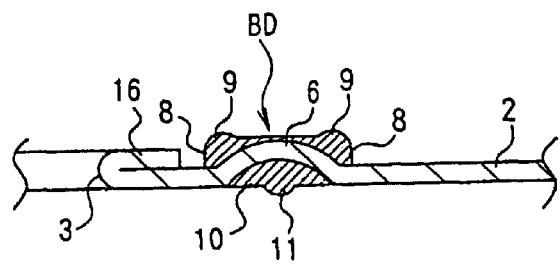
FIG. 12 is an additional example of protrusion formation.
Figure 13:
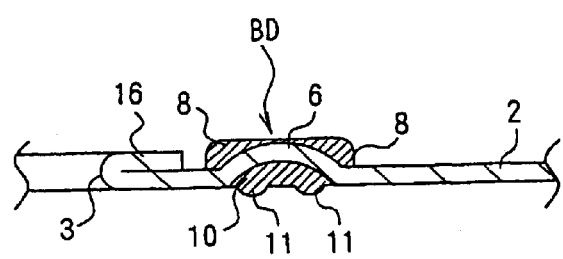
FIG. 13 is a still further example of protrusion formation.
Figure 14:
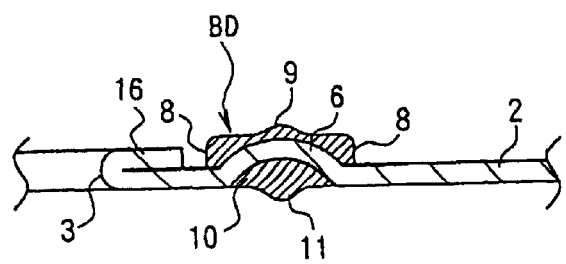
FIG. 14 is another example of protrusion formation.
Figure 15:
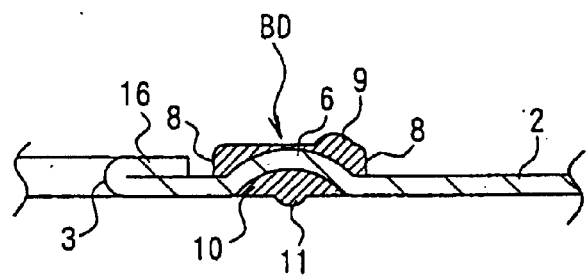
FIG. 15 is yet another example of protrusion formation.
Figure 16:
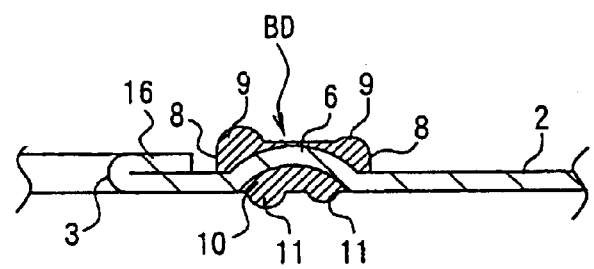
FIG. 16 is a still other example of protrusion formation.
Figure 17:
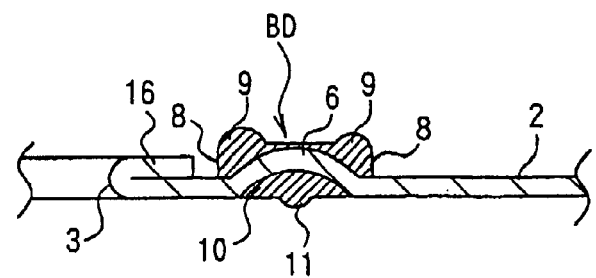
FIG. 17 is a further example of protrusion formation.

The protrusions 11, 9 arranged in the bead-width direction are not limited to one, and may be two or more as shown in FIGS. 11 to 13. When two or more protrusions are provided, the height of the protrusions 11, 9 may be made different. The magnitude of the protrusions may also be different. When a plurality of protrusions are formed, load of surface pressure can be alleviated, or if the surface pressure decreases, a labyrinth effect may be obtained by the plurality of protrusions 11, 9 or the de facto increase of the seal lines SL provides an effect of a stable sealing property for an extended period of time.

Further, with regard to the plurality of protrusions 11, 9, by making variations in the size or shape (the area unit length in a longitudinal sectional profile or a plan view) of the protrusions 11, 9 to seek optimization of the protrusions 11, 8 as shown in FIGS. 31 to 34, it is possible to enlarge the above-mentioned effects. In other words, when providing two or more protrusions in parallel widthwise, it is preferable to make the height of the protrusions 11, 9 relatively low or reduce the area per unit length on the higher surface pressure side.

With regard to a single-line protrusion 11, 9 extending along the seal line, it is possible to change the height or shape of the protrusion 11, 9 according to the surface pressure at the location of the protrusion 11, 9. In other words, in the areas where the surface pressure is relatively smaller, the height and the width of the protrusion 11, 9 may be increased.

The protrusions 11, 9 may be formed continuously along the whole length of the seal lines SL1 and SL2 or intermittently at specified intervals.

When the protrusions 11, 9 are formed partly on the seal lines SL1, SL2, they should be formed at positions that are far from the bolt hole and at relatively low surface pressure or at parts where changes in the clearance between the opposed joint surfaces are relatively large (the amplitude of surface pressure change is relatively large).

Figure 18:
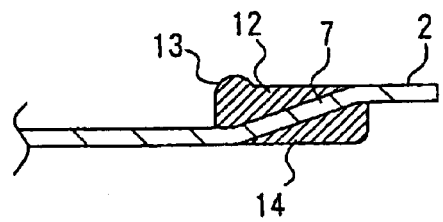
FIG. 18 is an example that the base-plate bead is a half bead.
Figure 19:
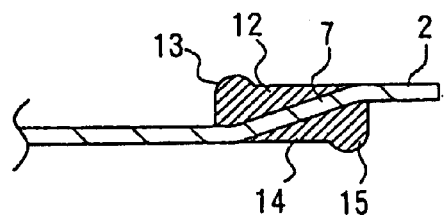
FIG. 19 is another example that the base-plate bead is a half bead.

In this embodiment, description has been made of the base-plate bead 6 as a full bead, but this embodiment is applicable when the base-plate bead 6 is a half bead in a stepped structure. More specifically, as shown in FIGS. 18 and 19, a second elastic sealing material 12 is fixed to the convex portion (the portion rising from the flat part of the base plate) of the base-plate bead 6 in a stepped form, a first elastic sealing material 14 is applied to the concave portion on the reverse side of the convex portion, and then protrusions 13, 15 are formed at the thick portions. The operation and the effect are the same as in the above-mentioned embodiment.

Figure 20:
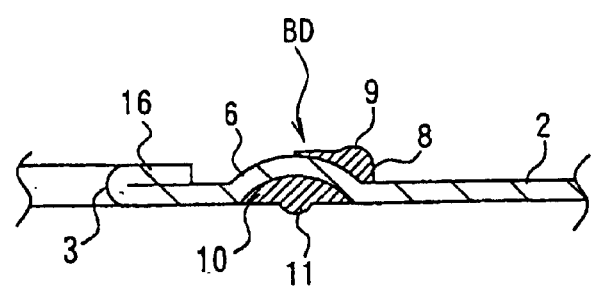
FIG. 20 is a modification of a second elastic sealing material.
Figure 21:
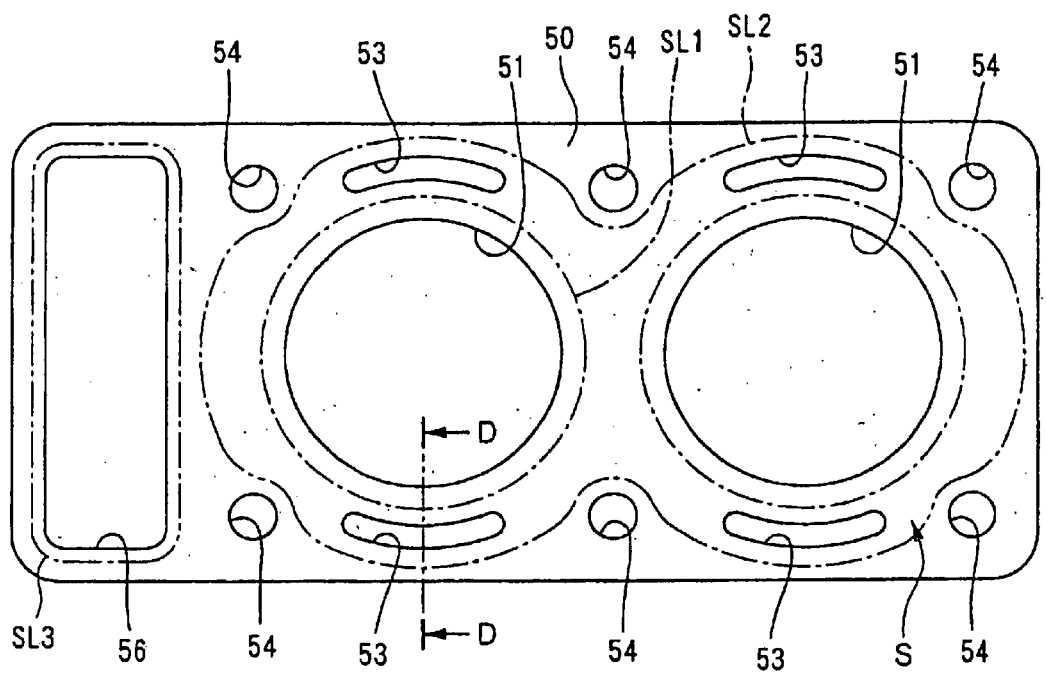
FIG. 21 is a plan view for explaining a conventional metallic gasket.
Figure 22:
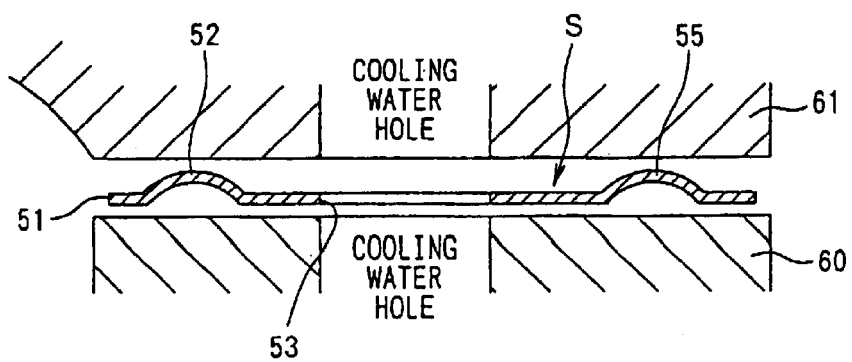
FIG. 22 is a sectional view taken along the line D—D in FIG. 21.
Figure 23:
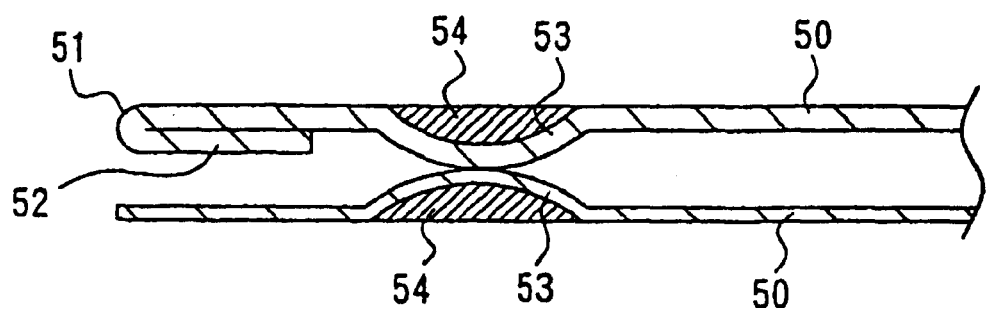
FIG. 23 is a diagram for explaining a conventional metal bead.

In the bead BD in the vicinity of the thickness-increased portion 1, the second elastic sealing material need not necessarily be attached to both sloped sides of the convex portion as shown in FIG. 20. In other words, receiving a relatively high surface pressure and having a strong force to constrain the base plate, the thickness-increased portion 16 inhibits the base plate from being deformed. This applies to the portions in the vicinity of clamping bolts.

The height of the protrusions 11, 9 should be designed such that the deformation ratio is not more than 25% when the protrusions are deformed to reach the thickness of the thickness-increased portion 16, regardless of the shape of protrusions.

In the above example, description has been made of a metallic gasket having a single base plate. In a metallic gasket, a plurality of base plates, each having the above-mentioned structure, may be stacked one over another according to the space between the joint surfaces. In this case, the base plates need not necessarily be stacked such that the convex portions of the base-plate beads are arranged face-to-face with each other as in prior art.

The other aspects of the structure, the operation and the effect are the same as in the above-mentioned embodiments.

INDUSTRIAL APPLICABILITY

As has been described, by adopting the present invention, the processing accuracy of the metal beads can be improved and the cooling effects can be increased on the metallic gasket itself and the joint surfaces between which the metallic gasket is sandwiched.

What is claimed is:

1. A metallic gasket comprising a base plate made of a thin metal plate, said base plate having at least a combustion chamber opening and a cooling water hole, and having a first thickness-increased portion made of metal and increased in thickness and encircling a peripheral edge of said combustion chamber opening, a first bead formed on the outer side of said first thickness-increased portion of said base plate in a manner to endlessly encircle said combustion chamber opening, and a second bead formed on the outer side of said first bead in a manner to endlessly encircle said combustion chamber opening and said cooling water hole, wherein in a region of said base plate between said first bead and said second bead, there are no holes other than said cooling water hole, and each of said first and second beads is a composite bead of a metal bead and a rubber bead, wherein said metal bead is formed only on one surface side of said base plate by bending said base plate in a through-thickness direction to create a convex portion higher than the height of said first thickness-increased portion, wherein said rubber bead is formed of an elastic sealing material fixed to said convex portion side surface of said metal bead and filled in a concave portion on the reverse side of said convex portion and said rubber bead is compressed and deformed in the through-thickness direction in cooperation with deformation of said metal bead, and wherein said elastic sealing material on the surface of said convex portion side is fixed at least to the surface of said convex portion of said metal bead and is arranged to have a height equal or substantially equal to the height of said metal bead, further a second thickness-increased portion is provided at an outer peripheral edge of said base plate.

2. A metallic gasket according to claim 1, wherein to equalize said surface pressure when said gasket is sandwiched between said joint surfaces, the height of said first thickness-increased portion is varied partly and the height of said second thickness-increased portion is lower than the lowest height of said first thickness-increased portion.

3. A metallic gasket according to claim 2, wherein said first thickness-increased portion is formed by folding back a peripheral edge on said combustion chamber opening side of said base plate, and a shim is fitted into said folded portion to thereby adjust the height of said first thickness-increased portion.

4. A metallic gasket according to claim 2, wherein said first thickness-increased portion is formed by folding back the peripheral end on said combustion chamber opening side of said base plate, and a leaf spring for spring action in the through-thickness direction is inserted in said folded portion.

5. A metallic gasket according to claim 2, wherein by partly varying at least one of a height of a protrusion and a width of said beads in the extending direction thereof, said sealing surface pressure by said beads is equalized in an extending direction thereof.

6. A metallic gasket according to claim 2, wherein a thin corrosion-resistant film is fixed to that portion of said base plate located between said first bead and said second bead and at least on the surface of said convex portion side of said metal beads on said base plate.

7. A metallic gasket according to claim 2, wherein one or not less than two lines of protrusions are provided along the seal lines of said sealing material, on at least either on one of the surface of said elastic sealing material fixed to the surface of said convex portion side and the surface of said elastic sealing material filled in said concave portion, said sealing material being used to constitute said rubber beads.

8. A metallic gasket according to claim 2, wherein one line or not less than two lines of protrusions are provided where the sealing pressure is relatively low on at least one of the surface of said elastic sealing material fixed to the surface of said convex portion side and the surface of said sealing material filled in said concave portion of said base plate, said sealing material being used to constitute said rubber beads.

9. A metallic gasket according to claim 7, wherein in the above-mentioned lines of protrusions, at least one of the height of said protrusion and the width in the extending direction thereof is varied according to said sealing pressure at formed positions said protrusions, and at least one of the height of said protrusion and the width is set at a larger value where said sealing pressure is lower.

10. A metallic gasket according to claim 7, wherein a plurality of protrusions are provided on at least one of the surface of elastic sealing material fixed to the surface of said convex portion side and the surface of said elastic sealing material filled in said concave portion of said beads, and in said plurality of protrusions, at least one of an area per height of protrusion and a unit length is varied according to said sealing pressure at formed positions of protrusions.

11. A metallic gasket according to claim 7, wherein a plurality of base plates are stacked in a multilayered structure.

* * * * *